UNITED STATES PATENT OFFICE.

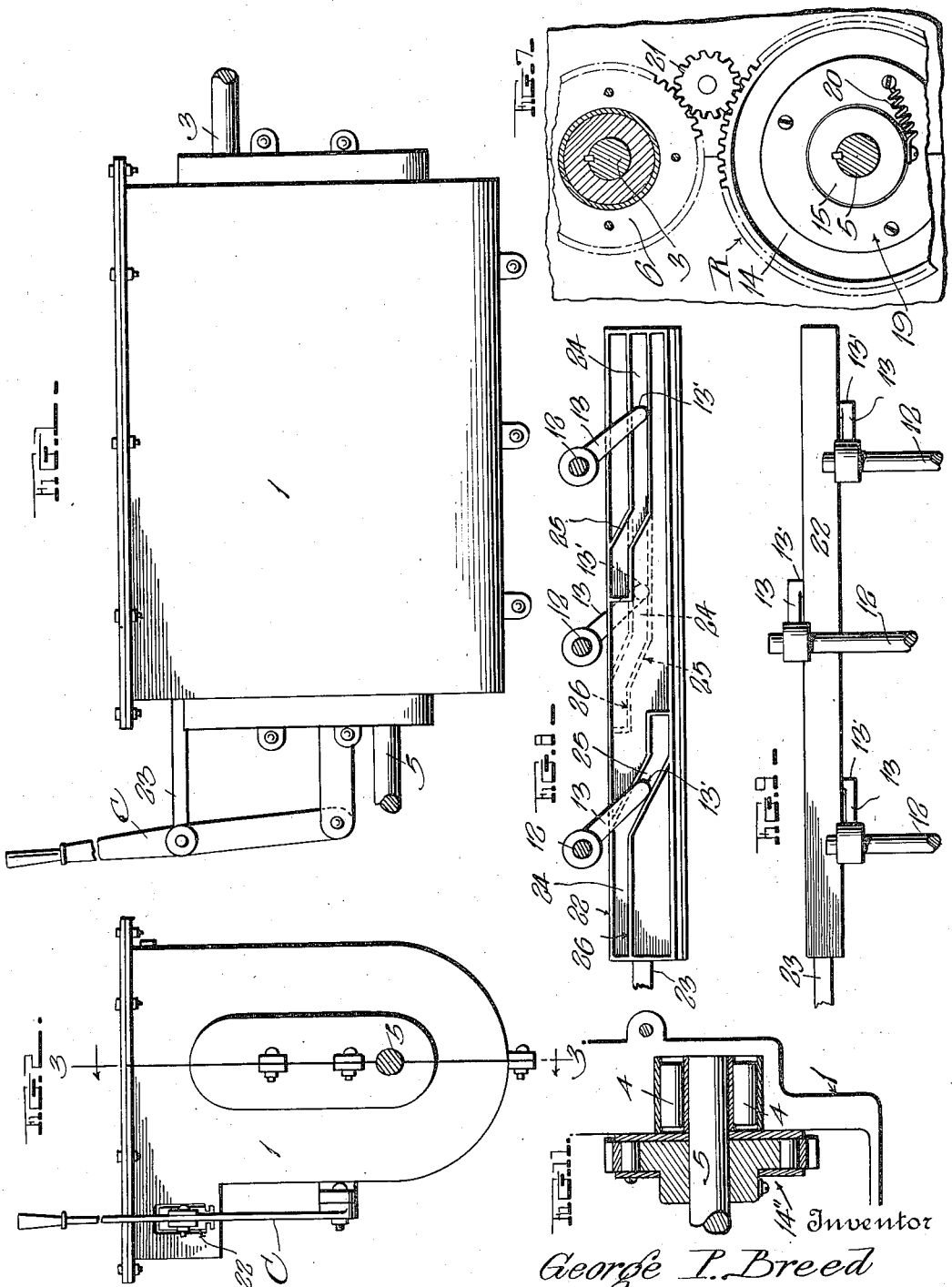

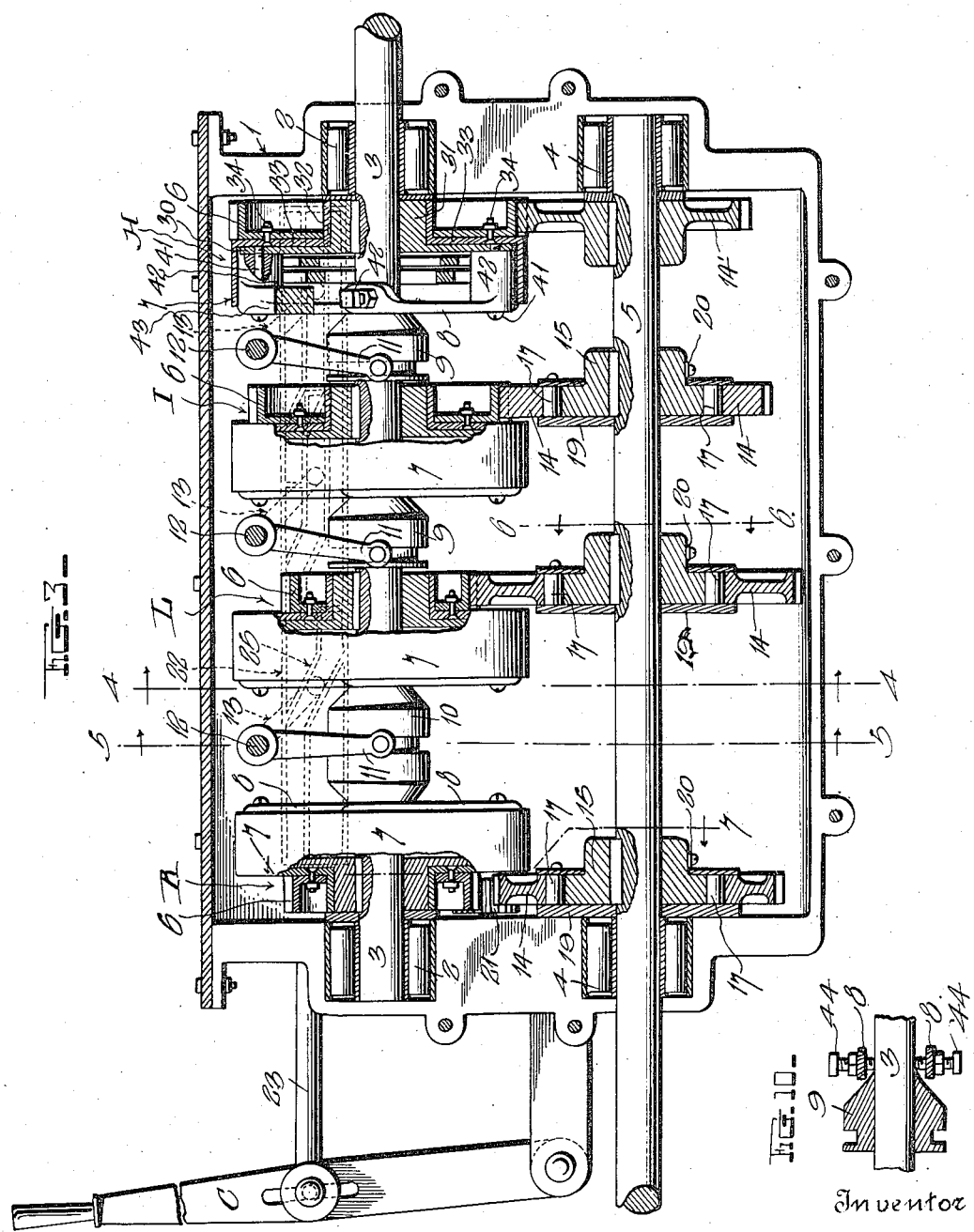

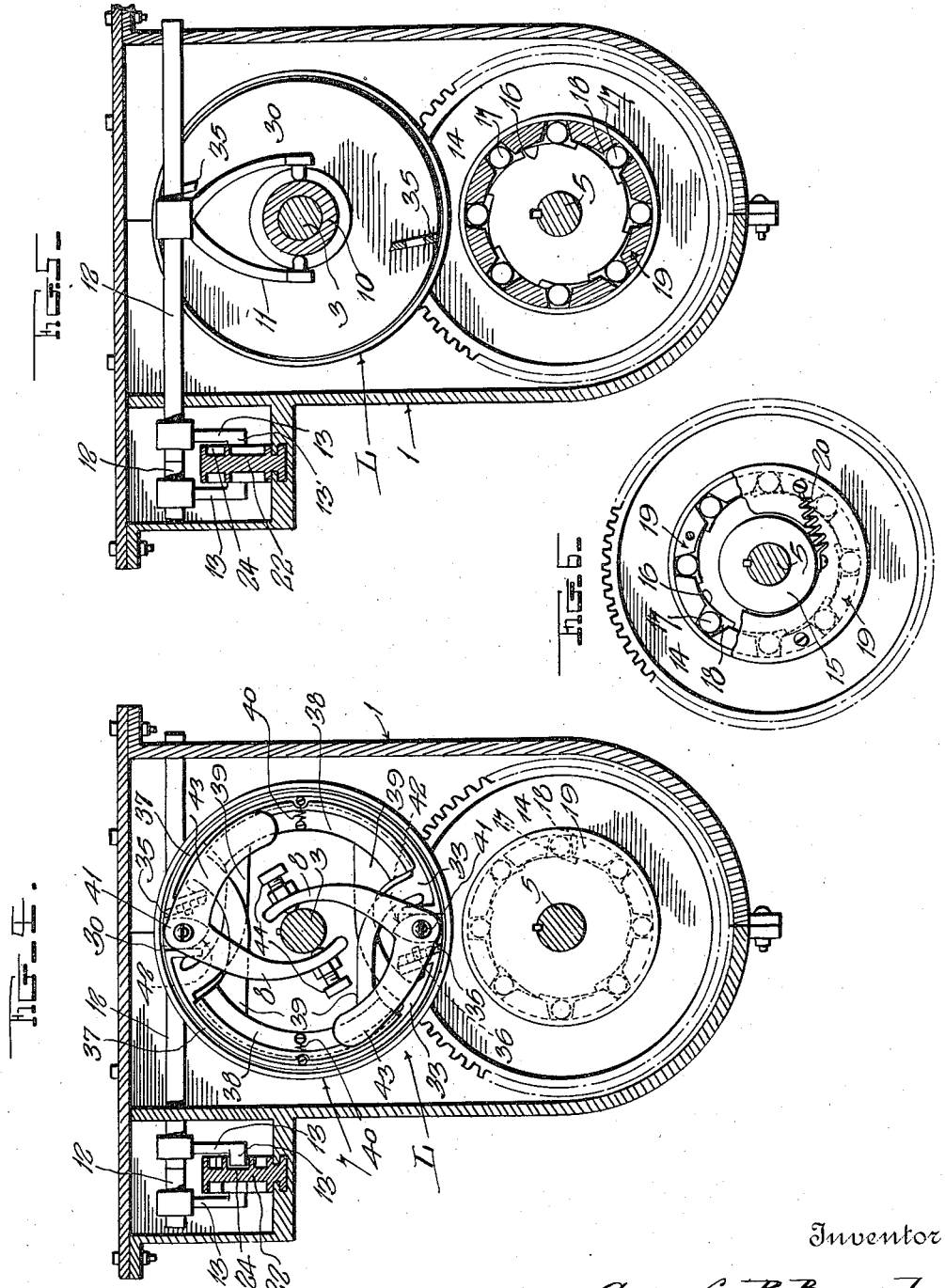

GEORGE P. BREED, OF RUBY, WISCONSIN, ASSIGNOR OF ONE-HALF TO WILLIAM D. PERSONS, OF WALNUT, CALIFORNIA.

TRANSMISSION-GEARING.

1,230,659.  Specification of Letters Patent.  Patented June 19, 1917.

Application filed June 22, 1916. Serial No. 105,285.

*To all whom it may concern:*

Be it known that I, GEORGE P. BREED, a citizen of the United States, residing at Ruby, in the county of Chippewa and State of Wisconsin, have invented certain new and useful Improvements in Transmission-Gearings; and I do declare the following to be a full, clear, and exact description of the invention, such as will enable others skilled in the art to which it appertains to make and use the same.

My invention which relates to improvements in transmission gearing for motor vehicles of numerous types, has for its main object to provide a combination of parts whereby the speed of the vehicle may be changed at will without varying that of the engine.

Briefly speaking, the invention consists of low, intermediate and high speed gearing units and a reversing unit, said units each consisting of constantly meshed gears and a clutch for throwing them into operation.

A further object of the invention is to provide a novel form of control whereby after shifting from low to high, the clutches of the low and intermediate units will remain in operative position to again take up the work of driving the vehicle when dropping back from high to intermediate and low.

Yet another object is to provide simple yet efficient means for permitting the low speed unit to travel idly when the intermediate unit is in use and for permitting both the low and intermediate units to run idly when the high speed unit is driving the machine.

With the foregoing general objects in view, the invention resides in certain novel features of construction and in unique combinations of parts to be hereinafter fully described and claimed, the descriptive matter being supplemented by the accompanying drawings which constitute a part of this application and in which:

Figure 1 is a side elevation of the improved transmission;

Fig. 2 is an end elevation thereof;

Fig. 3 is a central vertical longitudinal section on the plane of the line 3—3 of Fig. 2;

Figs. 4, 5, 6 and 7 are vertical transverse sections taken respectively on the planes indicated by the lines 4—4, 5—5, 6—6, and 7—7 of Fig. 3;

Fig. 8 is a side elevation of the control slide and parts coöperating therewith;

Fig. 9 is a top plan view thereof;

Fig. 10 is a detail section through one of the sliding collars for controlling the clutches;

Fig. 11 is a detail longitudinal section, showing a slightly different form of construction.

In specifically describing the structure shown in the drawings above briefly described, similar characters will be employed to designate corresponding parts throughout the several views and reference will be herein made to the numerous elements by their respective indices. To this end, the numeral 1 designates an appropriate two-part casing having roller bearings or the like 2 in which a drive shaft 3 is rotatably mounted, said shaft being driven from the engine through the instrumentality of any suitable type of clutch not shown, or due to the nature of the present invention, such a clutch may well be eliminated since when the control lever C is disposed in neutral position, none of the gearing units above referred to will be in operation. Additional roller bearings 4 rotatably support a second shaft 5 which will lead to the differential of the machine, the two shafts extending longitudinally through the casing 1 in parallel relation.

For driving the shaft 5 from the shaft 3, low, intermediate and high speed gearing units L, I and H respectively and a reversing unit R are employed, each of said units including a gear 6 loose on the shaft 3, and a clutch 7 for locking said gear to said shaft at will, each clutch having a pair of operating arms 8 terminating at opposed points adjacent the shaft 3 and adapted to be forced apart to throw the clutches into operation. Single acting collars 9 are slidably mounted on the shaft 3 for forcing the arms 8 of the units I and H apart, while a double acting sliding collar 10 is mounted on said shaft for controlling the levers 8 of the two units R and L. The collars 9 and 10 are peripherally grooved in an appropriate manner for the reception of forks 11, which forks are mounted on rock shafts 12, these shafts being equipped on their outer ends with crank arms 13.

The gears 6 of the low and intermediate units L and I and the reversing unit R, drive gear rings 14 which surround hubs 15 keyed on the shaft 5, said hubs having spiral cams 16 on their peripheries between which and the rings 14 a plurality of rollers 17 are mounted. The rollers 17 are received in pockets 18 of floating rings 19, coiled springs 20 being secured at one end to said rings and at their other ends to the hubs 15 in such a manner as to normally exert their tension to shift the rollers 17 into engagement with their respective cams 16. By this arrangement, when any one of the gear rings 14 is driven by its respective gear 6, the rollers 17 will bind between said rings and the cams 16 and will thus serve to transmit power to the hubs 15 on the shaft 5. When, however, the intermediate speed unit I is in operation, the rollers 17 of the low unit L travel toward the inner ends of the cams and will thus permit uninterrupted rotation of the shaft 5. Similarly, when the high speed unit H is in operation, the rollers 17 of the two units L and I will run idly and will therefore interfere in no manner with the rotation of the shaft 5. The last named shaft has keyed thereon a gear 14′ which meshes with the gear 6 of the high speed unit H. In some cases, the gear 14′ may be dispensed with in favor of the structure illustrated at 14″ in Fig. 11, this arrangement being identical with the roller ratchet mechanisms above described for making or breaking connection between the gear rings 14 and the hubs 15.

It may here be explained that although the structure of the parts associated with the ring 14 of the unit R is the same as that employed in connection with the units L and I, the cams of said unit R are reversed since the ring 14 of this unit is driven in a reverse direction from the other rings 14, due to the fact that the gear 6 of the unit R does not mesh directly with the ring 14 of said unit as is the case with the low and intermediate units L and I but drives said ring 14 through the instrumentality of an idle gear 21.

For controlling the rock shafts 12 to shift the collars 9 and 10 as occasion may demand, a slide 22 is connected with the control lever C by a rod or the like 23, said slide having runways 24 receiving projecting studs 13′ on the crank arms 13, the runway 24 of the arm 13 for the intermediate unit I being preferably disposed on the opposite side of the slide from the other runways.

Between their ends the runways 24 are formed with cams 25 adapted to successively rock the cranks 13 of the units L, I and H when the slide 22 is shifted forwardly by proper actuation of the lever C, it being essential that the runways of the units L and I be provided with straight portions 26 at the upper ends of the cams in order to retain the clutches of said units in operative position when the high speed unit H is in operation. By this arrangement, although the lower and intermediate units will be running idly when driving at high speed, said units will be in proper condition to pick up the load when the slide 22 is shifted rearwardly to decrease the speed of the machine. This action will take place when shifting from high to intermediate or from intermediate to low.

The arm 13 of the units R and L, said units having a single control arm, normally stands between the ends of its respective cam 25 as depicted in Fig. 1 the entire transmission then being in neutral position. When, however, the slide 22 is moved forwardly, the cams 25 will successively rock the shafts 12 of the low, intermediate and high speed units, and when moving said slide again rearwardly to neutral, said arms will be successively released. Rearward movement of slide 22 beyond its neutral position will throw the sliding collar 10 into position to spread the arms 8 of the clutch 7 of the reversing unit R with the result that the direction of rotation of shaft 5 will be reversed.

From the foregoing, the general construction of the improved transmission will be understood, by careful reference to the numerous figures of the drawings, but it may be well to describe briefly the structure of one of the clutches 7 and to this end reference may be had more particularly to Figs. 4 and 5.

Disks 30 are keyed on the drive shaft 3, said disks having hubs 31 upon which additional hubs 32 of drums 33 are rotatably mounted, said drums being secured by bolts or the like 34 to the gears 6. At diametrically opposite points on the disks 30, integral ears 35 project laterally therefrom, said ears being located somewhat tangentially and having slots which receive studs 36 on one end of a pair of friction shoes 37 which are adapted to coöperate with the drum 33, these friction shoes preferably having counterbalances 38 connected thereto by integral arms 39 whereby said shoes are prevented from being thrown outwardly against the drum by centrifugal force. Coiled springs 40 will also assist in preventing this as will be clear from Fig. 4. The arms 8 are fulcrumed at 41 between the ends of the two shoes 37, said arms having cams 42 which bear against the free ends of said shoes when the arms are forced apart by their respective collar on the shaft 3. To normally retain the arms 8 in operative position, they are preferably equipped with weights 43 which will be thrown outwardly by centrifugal force and will therefore hold the inner ends of said arms in proper relation in respect to the aforesaid collar. For purposes of adjustment to take up wear, screws 44 will be employed at the inner ends of the arms 8.

Although the type of clutch just described will be most universally employed on account of its efficiency and durability, any other suitable clutch may be employed and in fact numerous changes may be made within the scope of the invention as claimed without sacrificing the main advantages thereof, it being understood that the accompanying drawings are for illustrative purposes only and that I do not therefore wish to be unduly limited thereto.

I claim:

1. In a transmission gearing, the combination of a drive shaft, a second shaft to be driven, a comparatively high speed gearing unit consisting of a gear on the second shaft, a second gear meshed therewith and loose on the drive shaft, and a clutch for locking said second gear to said drive shaft, a comparatively low speed gearing unit consisting of a gear loose on the drive shaft, a clutch for locking it to said shaft, a gear ring meshed with said gear, a hub secured to the second shaft within said gear ring and having spiral cams on its periphery, rollers interposed between said cams and said ring, a floating ring having pockets in which said rollers are located, and spring means for impelling said floating ring in a direction to engage the rollers with the cams, and means for successively throwing the clutches of the low and high speed units into operation and for holding them in this condition, the cams and rollers running freely when the high speed unit is in use but serving to lock the gear ring to the driven shaft when the low speed unit is in use.

2. In a transmission gearing, the combination of a drive shaft, a second shaft, comparatively low and high speed gearing units for driving the second shaft from the drive shaft, each of said units consisting of constantly meshed gears, and a clutch for throwing them into operation, individual control members for said clutches, and a slide having individual runways for said members, both runways having cams for operating their respective control members successively, and the runway of the control member of the low speed unit having a straight portion in rear of its cam to hold this member in operative position while shifting the slide to throw the high speed unit into operation, said low speed unit including means for permitting idle movement thereof while said high speed unit is in operation.

3. A control slide for transmission gearing having control cranks, said slide having a plurality of longitudinally disposed runways to receive therein the crank arms of said gearing, said runways having cams for successively rocking said arms and certain thereof being equipped with straight portions in rear of said cams to retain their respective arms in operative position when once shifted.

4. In a transmission gearing, the combination of forward and reverse gears each including a clutch for throwing it into use, a double acting control member for throwing either of said clutches into operation, a rock shaft having connection with said control member for shifting it in either direction, a crank arm on said shaft, a slide, and a guideway extending obliquely of said slide, said crank arm having a lateral extension received in said guideway between the ends of the latter, whereby movement of the slide in reverse directions will correspondingly shift the control member.

In testimony whereof I have hereunto set my hand in presence of two subscribing witnesses.

GEORGE P. BREED.

Witnesses:
P. K. RISBERG,
H. A. ANDERSON.